United States Patent
Kim et al.

(10) Patent No.: US 11,299,655 B2
(45) Date of Patent: Apr. 12, 2022

(54) HIGHLY-DIELECTRIC, ELASTIC STRUCTURE AND A TOUCH SENSOR INCLUDING THE SAME

(71) Applicant: KOREA INSTITUTE OF SCIENCE AND TECHNOLOGY, Seoul (KR)

(72) Inventors: Heesuk Kim, Seoul (KR); Youngpyo Ko, Seoul (KR); Min Park, Seoul (KR); Sang-Soo Lee, Seoul (KR); Jeong Gon Son, Seoul (KR); Jong Hyuk Park, Seoul (KR); Seungjun Chung, Seoul (KR); Tae Ann Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 331 days.

(21) Appl. No.: 16/460,195

(22) Filed: Jul. 2, 2019

(65) Prior Publication Data
US 2020/0190372 A1    Jun. 18, 2020

(30) Foreign Application Priority Data
Dec. 14, 2018    (KR) .......................... 10-2018-0162364

(51) Int. Cl.
*C09J 9/02*    (2006.01)
*C09J 7/25*    (2018.01)
(Continued)

(52) U.S. Cl.
CPC .................. *C09J 9/02* (2013.01); *C09J 7/25* (2018.01); *C09J 7/30* (2018.01); *C09J 7/38* (2018.01);
(Continued)

(58) Field of Classification Search
CPC ......... C09J 9/02; C09J 7/30; C09J 7/38; C09J 7/25; G01D 5/24; H01B 5/16;
(Continued)

(56) References Cited

U.S. PATENT DOCUMENTS

2017/0075467 A1\* 3/2017 Kim .................... G01L 1/146
2020/0316908 A1\* 10/2020 Fukui .................... C09J 7/25

FOREIGN PATENT DOCUMENTS

| JP | 2016026552 A | 2/2016 |
| KR | 1020120064375 A | 6/2012 |

(Continued)

*Primary Examiner* — Amy He
(74) *Attorney, Agent, or Firm* — Rabin & Berdo, P.C.

(57) ABSTRACT

A highly-dielectric, elastic structure includes an elastic body that is highly-dielectric and includes a polymer matrix that including 1000 pbw of a polydimethylsiloxane (PDMS) base and 100 pbw of a PDMS curing agent, and has a tensile strength of 0.1 to 10 MPa; and 22.4 pbw of carbon black that is surface-treated with octadecyltrimethoxysilane (ODTMS) in an amount of at least 0.707 mmol per 22.4 pbw of the carbon black, and that is dispersed in the polymer matrix and cured; and an adhesive electrode that is stretchable, that is disposed on the elastic body, and that includes a polymer adhesive including a 500 pbw of a thermosetting silicone-based polymer adhesive including a curable polymer and a curing agent; and a conductive filler comprising 500 pbw of silver particles and 4000 pbw of a carbonaceous material that is a multi-walled carbon nanotube that are dispersed in the polymer adhesive and cured.

11 Claims, 4 Drawing Sheets

(51) Int. Cl.
  *C09J 7/38* (2018.01)
  *C09J 11/04* (2006.01)
  *G01D 5/24* (2006.01)
  *C09J 7/30* (2018.01)
  *H01B 5/16* (2006.01)
  *G06F 3/041* (2006.01)
  *C08K 3/22* (2006.01)

(52) U.S. Cl.
  CPC ................ *C09J 11/04* (2013.01); *G01D 5/24* (2013.01); *G06F 3/0414* (2013.01); *H01B 5/16* (2013.01); *C08K 3/22* (2013.01); *C09J 2203/326* (2013.01); *C09J 2301/408* (2020.08); *C09J 2301/41* (2020.08); *C09J 2483/006* (2013.01)

(58) Field of Classification Search
  CPC ......... G06F 3/0414; G06F 3/044; C08K 3/22; C08K 3/041; C08K 3/042
  See application file for complete search history.

(56) References Cited

FOREIGN PATENT DOCUMENTS

| | | |
|---|---|---|
| KR | 10-1819272 B1 | 1/2018 |
| KR | 1020180005957 A | 1/2018 |

\* cited by examiner

➢ Stretchable adhesive electrode

➢ Electrode after 10th touching

➢ Electrode after 100th touching

➢ Electrode after 100th touching at 500 kPa

FIG. 4

HIGHLY-DIELECTRIC, ELASTIC STRUCTURE AND A TOUCH SENSOR INCLUDING THE SAME

CROSS-REFERENCE TO RELATED APPLICATIONS

This application claims, under 35 U.S.C. § 119, the priority of Korean Patent Application No. 10-2018-0162364 filed on Dec. 14, 2018 in the Korean Intellectual Property Office, the disclosure of which is incorporated herein by reference in its entirety.

TECHNICAL FIELD

The present disclosure relates to a highly dielectric elastic structure and a method for manufacturing the same, more particularly, to a highly dielectric elastic structure which contains a stretchable conductive adhesive as an electrode on a highly dielectric elastic body so as to stably exhibit high dielectric properties of the elastic body, and a method for preparing the same.

BACKGROUND

In general, polymer materials have superior mechanical stability and processability as compared to other materials. Therefore, they are used as important materials in the modern high-tech industries. In addition, they are used as dielectric materials because various physical properties can be obtained through various molecular design and composition. However, there are limitations in application because their dielectric properties, thermal properties and mechanical properties are weak as compared to ceramic materials.

Nevertheless, the polymers are suitable to be applied as elastic electronic materials and are used in touch sensors, highly dielectric (high-k) thin-film gates, elastomer actuators, etc. through composition.

Among these, touch sensors are being applied in various fields such as touch screens, wearable devices, robots, smart devices, etc. For a sensor, durability and reliability are important. Also, the function of detecting various force and position at the same time is important. In addition, the touch sensors are drawing a lot of interests in the industry because they can be manufactured at low cost through simple processes.

The sensing method by a touch sensor can be classified into resistance type, capacitive type, piezoelectric type, or the like. A capacitive-type touch sensor has the advantage of being able to detect different signals depending on the contact position and contact force, but there is much limitation due to the limitations of the dielectric material.

Recently, research and development are made on structural control of the dielectric material and composite structures with the highly dielectric filler in order to solve these problems. However, because of unsatisfactory durability of the electrode and poor adhesion between the elastic dielectric and the electrode, the mechanical stability is unsatisfactory. Therefore, there is a problem that the dielectric properties are not exerted as desired and the reliability is not secured properly.

REFERENCES OF RELATED ART

Patent Documents

Korean Patent Registration No. 10-1819272.

SUMMARY

The present disclosure is directed to providing a highly dielectric elastic structure, which exhibits stable dielectric properties and improved mechanical stability, by increasing dielectric constant through composition of a polymer dielectric material and a conductive filler such as a carbonaceous material and forming a stretchable conductive adhesive as an electrode on the composited material, and a method for preparing the same.

The present disclosure is also directed to solving the problems of electrode destruction that may occur in a touch sensor and decreased dielectric properties caused by poor adhesion between the highly dielectric elastic structure and the electrode, by increasing dielectric constant through composition of a polymer dielectric material and a conductive filler such as a carbonaceous material and forming a stretchable conductive adhesive as an electrode on the composited material, thereby providing a touch sensor capable of exhibiting stable dielectric properties.

In an aspect, the present disclosure provides a highly dielectric elastic structure, which contains: a highly dielectric elastic body containing a polymer matrix and a dielectric material dispersed in the polymer matrix; and a stretchable adhesive electrode disposed on the highly dielectric elastic body; wherein the stretchable adhesive electrode contains: a polymer adhesive containing a curable polymer and a curing agent; and a conductive filler containing a metal and a carbonaceous material dispersed in the polymer adhesive.

The polymer matrix may be one or more selected from a group consisting of a silicone-based resin, a urethane-based resin, an acrylic resin, an isoprene-based resin, a chloroprene-based resin, a fluorine-based resin, butadiene rubber, styrene-butadiene rubber and a vinylidene fluoride polymer.

Specifically, the polymer matrix may be a silicon-based resin.

The silicone-based resin may be polydimethylsiloxane (PDMS).

The polymer matrix may have a tensile strength of 0.1 to 10 MPa.

The polymer matrix may have a dielectric constant of 1-10.

The dielectric material may contain at least one selected from a conductive filler, a ceramic filler and an organometallic compound, and the at least one selected from the conductive filler, the ceramic filler and the organometallic compound may be surface-treated with a silane-based compound or an amine-based compound.

The conductive filler may be at least one selected from metal particles, carbon black, carbon fiber, graphene, graphite, fullerene, single-walled carbon nanotube and multi-walled carbon nanotube.

The ceramic filler may be at least one selected from metal oxide, silicate, boride, carbide, nitride and perovskite.

The metal oxide may be one or more selected from $ZrO_2$, $Ta_2O_5$, $SnO_2$, $Nb_2O_5$, $TiO_2$, $S_2O_3$, $V_2O_5$, $FeO$, $FeO_4$, $Fe_2O_3$, $SrO$, $Cu_2O$, $Cu_2O_3$, $ZnO$, $Y_2O_3$, $CaTiO_3$, $MgZrSrTiO_6$, $MgTiO_3$, $MgAl_2O_4$, $BaZrO_3$, $BaTiO_3$, $BaSnO_3$, $BaNb_2O_6$, $BaTa_2O_6$, $BaSrTiO_3$, $W_{O3}$, $MnO_2$, $SrZrO_3$, $SnTiO_4$, $ZrTiO_4$, $CaZrO_3$, $CaSnO_3$, $CaWO_4$, $MgTa_2O_6$, $MrZrO_3$, $La_2O_3$, $CaZrO_3$, $MgSnO_3$, $MgNb_2O_6$, $SrNb_2O_6$, $MgTa_2O_6$ and $Ta_2O_3$.

The silicate may be at least one selected from $Na_2SiO_3$, $Li_4SiO_4$, $BaTiSi_3O_9$, $ZrSiO_4$, $CaMgSi_2O_6$ and $Zn_2SiO_4$.

The organometallic compound may be a compound wherein at least one metal selected from copper, zinc and nickel is bound to one or more organic substance selected from phthalocyanine, uranine and rhodamine.

The silane-based compound or the amine-based compound may be at least one selected from octadecyltrimethoxysilane (ODTMS), hexadecyltrimethoxy silane, dodecyltrimethoxysilane (DDTMS), octyltrimethoxysilane (OTMS), octadecylamine and dodecylamine.

Specifically, the silane-based compound may be octadecyltrimethoxysilane (ODTMS).

The highly dielectric elastic body may contain from 0.1 to 100 parts by weight of the dielectric material based on 100 parts by weight of the polymer matrix.

The polymer matrix may contain 5-20 parts by weight of the curing agent based on 100 parts by weight of the polymer.

The polymer adhesive may have a mixture viscosity 3000 mPa·s to 5000 mPa·s before curing.

The polymer adhesive may have a bulk tensile strength of 0.1 to 10 MPa after curing.

The polymer adhesive may have a volume shrinkage ratio of 1 to 10% after curing.

The stretchable adhesive electrode may contain 100 to 500 parts by weight of the conductive filler based on 100 parts by weight of the polymeric adhesive.

The curable polymer may include at least one member selected from a silicone-based resin, a urethane-based resin, an acrylic resin, an isoprene-based resin, a chloroprene-based resin, a fluorine-based resin, butadiene rubber and styrene-butadiene rubber.

The curable polymer may include a silicone-based resin.

The polymer adhesive may contain 10 to 120 parts by weight of the curing agent based on 100 parts by weight of the curable polymer.

The metal may be at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir).

Specifically, the metal may be at least one selected from gold (Au), silver (Ag) and copper (Cu).

The metal may be a mixture of metal particles having a diameter of 100 to 200 nm, 1 to 4 μm, or 5 to 10 μm.

The carbonaceous material may be at least one selected from single-walled carbon nanotube, multi-walled carbon nanotube, graphene, graphite, carbon black, carbon fiber and fullerene.

The carbonaceous material may be multi-walled carbon nanotube having a diameter of 15 to 40 nm and a length of 10 to 50 μm.

The conductive filler may contain 0.1 to 2 parts by weight of the carbonaceous material based on 100 parts by weight of the metal.

The dielectric elastic body and the stretchable adhesive electrode may be connected to each other to form a single structure.

In another aspect, the present disclosure provides a method for preparing a highly dielectric elastic structure, which includes:

(a) a step of preparing a dielectric material dispersion by dispersing a dielectric material in an organic solvent;

(b) a step of preparing a dielectric material/polymer mixture wherein a dielectric material is mixed with a polymer by mixing the polymer with the dielectric material dispersion;

(c) a step of preparing a highly dielectric elastic body by mixing the dielectric material/polymer mixture with a curing agent and then performing curing; and (d) a step of preparing a highly dielectric elastic structure by forming a stretchable adhesive electrode on the dielectric elastic body.

The organic solvent in the step (a) may be at least one selected from chloroform, toluene, ethanol, methanol, dichloromethane and tetrahydrofuran.

The dielectric material/polymer mixture in the step (b) may contain from 0.1 to 100 parts by weight of the dielectric material based on 100 parts by weight of the polymer.

In the step (b), a step of removing the solvent may be carried out additionally after the mixing of the polymer with the dielectric material dispersion.

In the step (c), 5 parts to 20 parts by weight of the curing agent may be mixed with 100 parts by weight of the polymer.

The step (d) may include:

(d-1) a step of preparing a conductive filler dispersion by dispersing a metal and a carbonaceous material in an organic solvent;

(d-2) a step of preparing a mixture of a conductive filler and a polymer adhesive by mixing a curable polymer and a curing agent with the conductive filler dispersion and then removing the solvent; and (d-3) a step of forming a stretchable adhesive electrode by coating the mixture of the conductive filler and the polymer adhesive on the highly dielectric elastic body to form an additive mixture coating layer, and then carrying out curing.

In the step (d-1), the conductive filler dispersion may be prepared by dispersing 0.1 to 2 parts by weight of the carbonaceous material based on 100 parts by weight of the metal in the organic solvent.

Most specifically, in the step (a), the dielectric material may be carbon black, the carbon black may be surface-treated with octadecyltrimethoxysilane (ODTMS), and the organic solvent used to disperse the carbonaceous material may be chloroform, in the step (b), the polymer may be polydimethylsiloxane (PDMS), and the dielectric material/polymer mixture may be a mixture of 1-3 parts of the surface-treated carbon black based on 100 parts by weight of polydimethylsiloxane (PDMS), in the step (c), a coating film with a thickness of 100-500 μm may be formed by using 5-20 parts by weight of the curing agent based on 100 parts by weight of the polydimethylsiloxane (PDMS) and performing curing at a curing temperature of 120-180° C. for a curing time of 60-120 minutes, and in the step (d), the stretchable adhesive electrode may contain, in addition to the polymeric adhesive containing a silicon polymer and a curing agent, multi-walled carbon nanotubes and silver (Ag) particles as a conductive filler, the silver (Ag) particles may be a mixture of particles having a diameter of 100-200 nm, 1-4 μm, or 5-10 μm, the multi-walled carbon nanotube may have a diameter of 15-40 nm and a length of 10-50 μm, the silver (Ag) particles may contain 0.1-2 parts by weight of carbonaceous material based on 100 parts by weight, and 100-500 parts by weight of the conductive filler may be mixed based on 100 parts by weight of the polymer adhesive.

In a further another aspect, the present disclosure provides a touch sensor containing the highly dielectric elastic structure.

The touch sensor may be a capacitance-type force sensor.

In a further another aspect, the present disclosure provides a method for preparing a touch sensor, which includes a method for preparing the highly dielectric elastic structure prepared according to the method described above.

A highly dielectric elastic structure of the present disclosure provides the effects of increasing dielectric constant through composition of a polymer dielectric and a dielectric material, improving dielectric properties by forming a stretchable conductive adhesive on the composite material as an electrode and exhibiting stable dielectric properties by improving mechanical stability.

Further, a touch sensor containing the highly dielectric elastic structure of the present disclosure provides the effect of minimizing reduction in dielectric properties, etc. that occurs due to electrode breakdown and poor adhesion of the highly dielectric elastic structure to the electrode.

DETAILED DESCRIPTION OF EMBODIMENTS

Hereinafter, various aspects and exemplary embodiments of the present disclosure are described in more detail. Hereinafter, the exemplary embodiments of the present disclosure are described in detail with reference to accompanying drawings so that those of ordinary skill in the art to which the present disclosure belongs can easily carry out the present disclosure. However, the following description is not intended to limit the present disclosure to specific exemplary embodiments. When it is determined that there is a specific description of the related art in the following description of the present disclosure that may obscure the subject matter of the present disclosure, a detailed description thereof will be omitted.

The terms used herein are merely used to describe particular exemplary embodiments, and are not intended to limit the present disclosure. A singular expression includes plural forms unless the context clearly indicates otherwise. In this application, the terms "contain", "include" or "have" are used to specify that the features, numbers, steps, operations, elements or combinations thereof described in the specification are present, and the presence or addition of one or more other features, numbers, steps, operations, elements or combinations thereof are not intended to be precluded.

Hereinafter, a highly dielectric elastic structure of the present disclosure is described.

A highly dielectric elastic structure of the present disclosure contains: a highly dielectric elastic body containing a polymer matrix and a dielectric material dispersed in the polymer matrix; and a stretchable adhesive electrode disposed on the highly dielectric elastic body, wherein the stretchable adhesive electrode contains: a polymer adhesive containing a curable polymer and a curing agent; and a conductive filler containing a metal and a carbonaceous material dispersed in the polymer adhesive.

First, the highly dielectric elastic body is described.

Specifically, the polymer matrix may be at least one selected from a silicone-based resin, a urethane-based resin, an acrylic resin, an isoprene-based resin, a chloroprene-based resin, a fluorine-based resin, butadiene rubber, styrene-butadiene rubber and a vinylidene fluoride polymer. More specifically, the polymer matrix may be a silicon-based resin, and even more specifically, the polymer matrix may be polydimethylsiloxane (PDMS) as a the silicone-based resin.

Specifically, the polymer matrix may have a tensile strength of 0.1-10 MPa and a dielectric constant of 1-10. It is preferred that it has no conductivity.

When the tensile strength and the dielectric constant of the polymer matrix exceed the upper limits or are below the lower limits, the performance of a manufactured touch sensor may be unsatisfactory due to undesirable dielectric constant and elasticity.

The dielectric material may contain at least one selected from a conductive filler, a ceramic filler and an organometallic compound, and the at least one selected from the conductive filler, the ceramic filler and the organometallic compound may be surface-treated with a silane-based compound or an amine-based compound.

The conductive filler may be at least one selected from metal particles, carbon black, carbon fiber, graphene, graphite, fullerene, single-walled carbon nanotube and multi-walled carbon nanotube.

The ceramic filler may be at least one selected from metal oxide, silicate, boride, carbide, nitride and perovskite.

The metal oxide as the ceramic filler may be at least one selected from $ZrO_2$, $Ta_2O_5$, $SnO_2$, $Nb_2O_5$, $TiO_2$, $Sb_2O_3$, $V_2O_5$, FeO, $FeO_4$, $Fe_2O_3$, SrO, $Cu_2O$, $Cu_2O_3$, ZnO, $Y_2O_3$, $CaTiO_3$, $MgZrSrTiO_6$, $MgTiO_3$, $MgAl_2O_4$, $BaZrO_3$, $BaTiO_3$, $BaSnO_3$, $BaNb_2O_6$, $BaTa_2O_6$, $BaSrTiO_3$, $W_{O3}$, $MnO_2$, $SrZrO_3$, $SnTiO_4$, $ZrTiO_4$, $CaZrO_3$, $CaSnO_3$, $CaWO_4$, $MgTa_2O_6$, $MrZrO_3$, $La_2O_3$, $CaZrO_3$, $MgSnO_3$, $MgNb_2O_6$, $SrNb_2O_6$, $MgTa_2O_6$ and $Ta_2O_3$.

The silicate as the ceramic filler may be at least one selected from $Na_2SiO_3$, $Li_4SiO_4$, $BaTiSi_3O_9$, $ZrSiO_4$, $CaMgSi_2O_6$ and $Zn_2SiO_4$.

The organometallic compound may be a compound wherein at least one metal selected from copper, zinc and nickel is bound to one or more organic substance selected from phthalocyanine, uranine and rhodamine.

The silane-based compound or the amine compound used for the surface treatment of the dielectric material may be at least one selected from octadecyltrimethoxysilane (ODTMS), hexadecyltrimethoxysilane, dodecyltrimethoxysilane (DDTMS), octyltrimethoxysilane (OTMS), octadecylamine and dodecylamine. Specifically, it may be octadecyltrimethoxysilane (ODTMS).

Specifically, the dielectric elastic body may contain 0.1 to 100 parts by weight of the dielectric material based on 100 parts by weight of the polymer matrix. When the content of the dielectric material is less than 0.1 part by weight based on 100 parts by weight of the polymer matrix, the dielectric constant may decrease. And, when it exceeds 100 parts by weight, the curing of the polymer may be negatively affected.

The polymer matrix may contain 5-20 parts by weight of the curing agent based on 100 parts by weight of the polymer.

Hereinafter, the stretchable adhesive electrode contained in the highly dielectric elastic structure of the present disclosure will be described.

The polymer adhesive contained in the stretchable adhesive electrode contains a curable polymer and a curing agent. It may have a mixture viscosity of 3000-5000 mPa·s before curing, a bulk tensile strength of 0.1-10 MPa after curing, and a volume shrinkage ratio of 1-10% after curing.

The stretchable adhesive electrode may contain 100 to 500 parts by weight of the conductive filler based on 100 parts by weight of the polymeric adhesive.

The curable polymer contained in the polymer adhesive may be at least one selected from a silicone-based resin, a urethane-based resin, an acrylic resin, an isoprene-based resin, a chloroprene-based resin, a fluorine-based resin, butadiene rubber and styrene-butadiene rubber. Specifically, a silicone-based resin may be contained.

The polymer adhesive may contain 10 to 120 parts by weight of the curing agent based on 100 parts by weight of the curable polymer.

The metal may be at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir), Specifically, the metal may be at least one selected from gold (Au), silver (Ag) and copper (Cu).

Specifically, the metal may be a mixture of metal particles having a diameter of 100 to 200 nm, 1 to 4 μm, or 5 to 10 μm.

The carbonaceous material may be at least one selected from single-walled carbon nanotube, multi-walled carbon nanotube, graphene, graphite, carbon black, carbon fiber and fullerene.

Specifically, the carbonaceous material may be multi-walled carbon nanotube having a diameter of 15 to 40 nm and a length of 10 to 50 μm.

Specifically, the conductive filler may be contained in an amount of 0.1 to 2 parts based on 100 parts by weight of the metal.

Specifically, the highly dielectric elastic body and the stretchable adhesive electrode may be connected to each other to form a single structure. Therefore, it is preferred that the polymer contained in the highly dielectric elastic body and the polymer contained in the stretchable adhesive electrode are of the same polymer family. Accordingly, the highly dielectric elastic structure of the present disclosure can exert increased adhesion between the polymeric elastic body and the stretchable adhesive electrode as well as sufficient dielectric properties.

Figure 1:
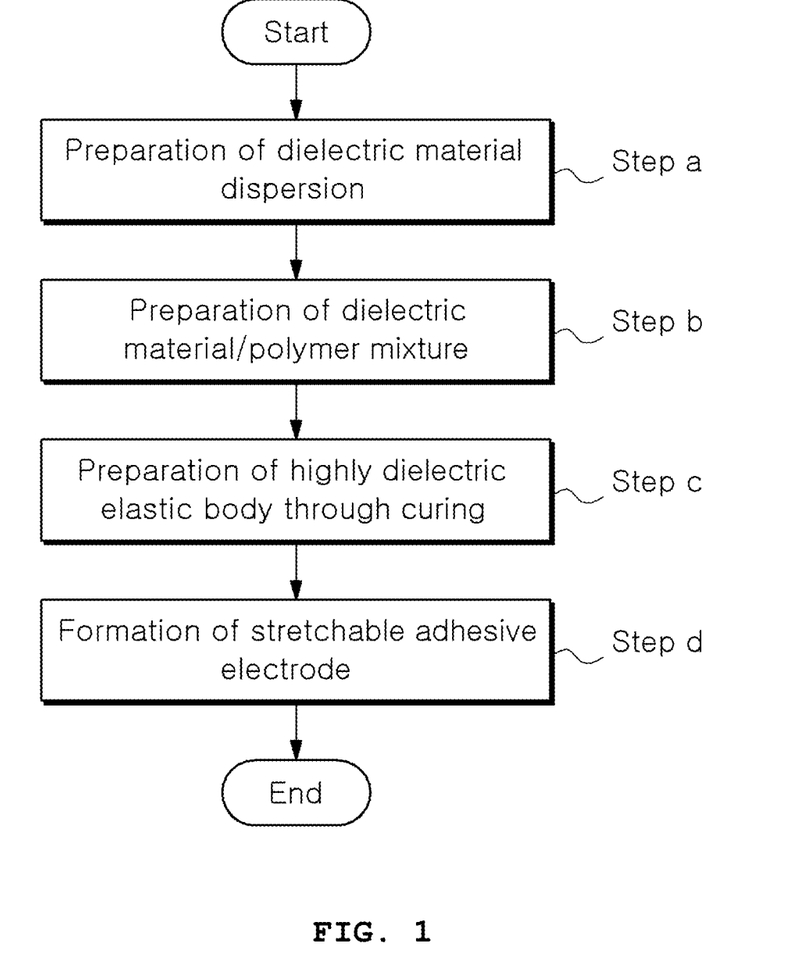
FIG. 1 is a flow chart sequentially showing a method for preparing a highly dielectric elastic structure of the present disclosure.

FIG. 1 sequentially shows a method for preparing a highly dielectric elastic structure of the present disclosure. Hereinafter, the method for preparing a highly dielectric elastic structure of the present disclosure will be described with reference to FIG. 1.

First, a Dielectric Material is Dispersed in an Organic Solvent to Prepare a Dielectric Material Dispersion (Step a).

For details about the dielectric material, refer to the above description.

The organic solvent may be one or more selected from chloroform, toluene, ethanol, methanol, dichloromethane and tetrahydrofuran. Specifically, when chloroform is used, the dispersion of the dielectric material and the drying of the solvent may be conducted easily.

Specifically, the amount of the dielectric material may be 0.1 to 100 parts by weight based on 100 parts by weight of the polymer.

Next, a Dielectric Material/Polymer Mixture Wherein a Dielectric Material and a Polymer are Mixed is Prepared by Mixing the Dielectric Material Dispersion with the Polymer (Step b).

The dielectric material/polymer mixture may contain specifically 0.1 to 100 parts by weight, more specifically 1 to 5 parts by weight, of the dielectric material based on 100 parts by weight of the polymer.

When the content of the dielectric material is less than 0.1 part by weight based on 100 parts by weight of polymer, the dielectric constant of the finally prepared elastic structure may decrease. And, when it exceeds 100 parts by weight, the curing of the polymer may be negatively affected.

Specifically, the mixing may be carried out by stirring and degassing processes at the same time. For this, a high-viscosity mixing/degassing apparatus may be used.

After mixing the dielectric material dispersion with the polymer, the solvent may be removed through drying.

Then, a Highly Dielectric Elastic Body is Prepared by Mixing the Dielectric Material/Polymer Mixture with a Curing Agent and Performing Curing (Step c).

Specifically, the mixing amount of the curing agent may be 5 to 20 parts by weight per 100 parts by weight of the polymer.

Specifically, the mixing may be carried out by stirring and degassing processes at the same time. For this, a high-viscosity mixing/degassing apparatus may be used.

Specifically, the mixture of the dielectric material/polymer mixture and the curing agent may be cured after being coated on a substrate to form a film. Accordingly, it is possible to uniformly coat a stretchable adhesive agent in the next step.

The coating may be performed according to any one of the method selected from a doctor blade method, a bar coating method, a flat screen method, a spin coating method, a roll coating method, a flow coating method, a gravure printing method and a flexographic printing method.

Finally, a Highly Elastic Dielectric Structure is Prepared by Forming a Stretchable Adhesive Electrode on the Highly Dielectric Elastic Body (Step d).

This step can be carried out according to the following procedure.

First, a conductive filler dispersion is prepared by dispersing a metal and a carbonaceous material in an organic solvent (step d-1).

Specifically, the conductive filler dispersion may prepared by dispersing 0.1 to 2 parts by weight of the carbonaceous material based on 100 parts by weight of the metal in the organic solvent.

The metal may be at least one selected from gold (Au), silver (Ag), copper (Cu), nickel (Ni), aluminum (Al), platinum (Pt), ruthenium (Ru), rhodium (Rh), tungsten (W), cobalt (Co), palladium (Pd), titanium (Ti), tantalum (Ta), iron (Fe), molybdenum (Mo), hafnium (Hf), lanthanum (La) and iridium (Ir), specifically at least one selected from gold (Au), silver (Ag) and copper (Cu).

More specifically, it may be a mixture of (Ag) particles whose diameter is 100 to 200 nm, 1 to 4 μm, or 5 to 10 μm.

The carbonaceous material may be at least one selected from single-walled carbon nanotube, multi-walled carbon nanotube, graphene, graphite, carbon black, carbon fiber and fullerene. Specifically, it may be multi-walled carbon nanotube with a length of 15 to 40 nm and a diameter of 10 to 50 μm.

The organic solvent may be any one selected from chloroform, toluene, ethanol, methanol, dichloromethane and tetrahydrofuran.

Then, a mixture of the conductive filler and a polymer adhesive is prepared by mixing the conductive filler dispersion with a curable polymer and a curing agent (step d-2).

The curable polymer contained in the stretchable adhesive electrode may be at least one selected from a silicon-based resin, a urethane-based resin, an acrylic resin, an isoprene-based resin, a chloroprene-based resin, a fluorine-based resin, butadiene rubber and styrene-butadiene rubber. Specifically, it may be a silicone-based resin.

Specifically, the mixing amount of the curing agent may be 0 to 120 parts by weight based on 100 parts by weight of the curable polymer.

Next, a stretchable adhesive electrode is formed by forming an adhesive mixture coating layer on the highly dielectric elastic body by coating the mixture of the conductive filler and the polymer adhesive and then curing the same (step d-3).

The coating may be performed according to any one of the method selected from a doctor blade method, a flat screen method, a spin coating method, a roll coating method, a flow coating method, a gravure printing method and a flexographic printing method.

The thickness of the adhesive mixture coating layer may be from 10 to 200 μm.

The curing may be performed at a curing temperature of 150 to 200° C. for a curing time of 60 to 120 minutes.

The present disclosure provides a touch sensor containing the above-described highly dielectric elastic structure.

The touch sensor may be a capacitance-type force sensor.

The present disclosure provides a method for preparing a touch sensor, which includes the method for preparing a highly dielectric elastic structure described above.

In particular, although not explicitly described in the following examples, the highly dielectric elastic structure according to the present disclosure was prepared by varying the type of dielectric material, the type of surface treatment material and the organic solvent used in the step (a), the type of polymer, the compositional ratio and mixing method of the dielectric material/polymer mixture in the step (b), the coating method of the mixture of the dielectric material/polymer mixture and the curing agent, the content of the mixed the curing agent, the curing temperature and time and the thickness of coating film in the step (c), and the curing temperature and time and the content of the curing agent in the stretchable adhesive in the step (d).

The physical properties of the prepared highly dielectric elastic structure were confirmed by performing tests related to the dielectric constant and specific resistance of the stretchable adhesive electrode.

As a result, only when all of the following conditions were satisfied, unlike the other conditions and other numerical ranges, the dielectric constant was measured high, there was little electrode failure phenomenon, good mechanical properties were achieved due to good adhesion between the highly dielectric elastic body and the electrode, and the sensitivity when applied to a touch sensor was measured high. The preparation conditions are as follows.

In the step (a), the dielectric material is carbon black as a carbonaceous material, octadecylsilane (ODTMS) is used for surface treatment of the carbon black, and chloroform is used as an organic solvent to disperse the carbonaceous material. In the step (b), the polymer is polydimethylsiloxane (PDMS), and the dielectric material/polymer mixture is 1 to 3 parts by weight was of carbon black mixed with 100 parts by weight of polydimethylsiloxane (PDMS). In the step (c), the coating is carried out according to a doctor blade method or a bar coating method, 5 to 20 parts by weight of a curing agent is used based on 100 parts by weight of polydimethylsiloxane (PDMS), the curing is carried out at a curing temperature of 120 to 180° C. for a curing time of 60 to 120 minutes to form a coating film with a thickness of 100 to 500 μm. In the step (d), the stretchable adhesive electrode contains a polymer adhesive containing a silicone polymer and a curing agent and multi-walled carbon nanotube and silver (Ag) particles as a conductive filler, the silver (Ag) particles are a mixture of silver particles with a diameter of 100 to 200 nm, 1 to 4 μm or 5 to 10 μm, the multi-walled carbon nanotube has a diameter of 15 to 40 nm and a length of 10 to 50 μm, the amount of the carbonaceous material is 0.1 to 2 parts by weight based on 100 parts by weight of the silver (Ag) particles, and 100 to 500 parts by weight of the conductive filler is mixed based on 100 parts by weight of the polymer adhesive.

Hereinafter, the present disclosure is explained in more detail through examples, etc. In the followings, however, the examples, etc. should not be interpreted to reduce or limit the scope and content of present disclosure. In addition, it is obvious that those of ordinary skill can easily carry out the disclosure based on the present disclosure including the following examples.

EXAMPLES

Example 1

(1) Preparation of Highly Dielectric Elastic Body 22.4 mg of carbon black and 0.598 mmol of ODTMS (octadecyltrimethoxysilane) were added to chloroform and dispersed for 1 hour. Then, 1 g of transparent two-component thermosetting PDMS consisting of a base resin and a curing agent with a ratio of 10:1 was mixed and stirred. After the stirring was terminated, a mixture of the PDMS base and the ODTMS-surface-treated carbon black was prepared by removing the chloroform used in the dispersion of the filler on a hot plate at 59.5° C. The dispersion of the ODTMS-surface-treated carbon black was carried out by using an ultrasonic device and the mixing the ODTMS-surface-treated carbon black filler and the PDMS based dispersed in chloroform was carried out by using a high-viscosity mixing/degassing device. The stirring and degassing processes were conducted at the same time. Then, the mixture of the PDMS base and the ODTMS-surface-treated carbon black was mixed with 100 mg of a two-component thermosetting PDMS curing agent and then a film with of thickness 100 μm was prepared on a 100-μm copper substrate by utilizing a doctor blade method. The prepared film was cured at 150° C. for 90 minutes.

(2) Formation of Conductive Adhesive Electrode on Highly Dielectric Elastic Body 500 mg of silver (Ag)/multi-walled carbon nanotube (4 g/0.01 g) dispersed in chloroform and 500 mg of a transparent two-component thermosetting polymer adhesive were mixed and stirred. After completion of the reaction, a mixture of the polymer adhesive and the silver (Ag)/multi-walled carbon nanotube was prepared by removing the chloroform used in the dispersion of the filler at room temperature (25° C.). As the silver (Ag) particles, a mixture of silver (Ag) particles with three different diameters of 100 to 200 nm, 1 to 4 μm and 5 to 10 μm was used. As the multi-walled carbon nanotube, one having an average diameter of 30 nm and an average length of 30 μm was used. The dispersion of the silver (Ag)/multi-walled carbon nanotube was carried out by using an ultrasonic grinding device. The mixing of the silver (Ag)/multi-walled carbon nanotube dispersed in chloroform with the matrix of the adhesive polymer was carried out by using a high-viscosity mixing/degassing apparatus. The stirring and degassing processes were carried out at the same time. A stretchable conductive adhesive layer was prepared by coating the prepared mixture of the polymer adhesive and the silver (Ag)/multi-walled carbon nanotube on the highly dielectric elastic body prepared in (1) to a film thickness of 100 μm at 180° C. for 90 minutes and then curing the same.

Example 2

A highly dielectric elastic structure was prepared in the same manner as in Example 1, except that 0.707 mmol, instead of 0.598 mmol, of ODTMS was used.

Example 3

A highly dielectric elastic structure was prepared in the same manner as in Example 1, except that 0.825 mmol, instead of 0.598 mmol, of ODTMS was used.

Example 4

A highly dielectric elastic structure was prepared in the same manner as in Example 1, except that 0.943 mmol, instead of 0.598 mmol, of ODTMS was used.

Comparative Example 1

An elastic structure was prepared in the same manner as in Example 1, except that a Pt electrode was formed by using a sputter apparatus instead of forming the stretchable conductive adhesive electrode on the prepared highly dielectric elastic body.

Comparative Example 2

An elastic structure was prepared in the same manner as in Example 1, except that 0.707 mmol, instead of 0.598 mmol, of ODTMS was used and a Pt electrode was formed by using a sputter apparatus instead of forming the stretchable conductive adhesive electrode on the prepared highly dielectric elastic body.

Comparative Example 3

An elastic structure was prepared in the same manner as in Example 1, except that 0.825 mmol, instead of 0.598 mmol, of ODTMS was used and a Pt electrode was formed by using a sputter apparatus instead of forming the stretchable conductive adhesive electrode on the prepared highly dielectric elastic body.

Comparative Example 4

An elastic structure was prepared in the same manner as in Example 1, except that 0.943 mmol, instead of 0.598 mmol, of ODTMS was used and a Pt electrode was formed by using a sputter apparatus instead of forming the stretchable conductive adhesive electrode on the prepared highly dielectric elastic body.

Comparative Example 5

An elastic structure was prepared in the same manner as in Example 1, except that an acrylic silver paste electrode was formed instead of forming the stretchable conductive adhesive electrode on the prepared highly dielectric elastic body.

Comparative Example 6

An elastic structure was prepared in the same manner as in Example 1, except that 0.707 mmol, instead of 0.598 mmol, of ODTMS was used and an acrylic silver paste electrode was formed instead of forming the stretchable conductive adhesive electrode on the prepared highly dielectric elastic body.

Comparative Example 7

An elastic structure was prepared in the same manner as in Example 1, except that 0.825 mmol, instead of 0.598 mmol, of ODTMS was used and an acrylic silver paste electrode was formed instead of forming the stretchable conductive adhesive electrode on the prepared highly dielectric elastic body.

Comparative Example 8

An elastic structure was prepared in the same manner as in Example 1, except that 0.943 mmol, instead of 0.598 mmol, of ODTMS was used and an acrylic silver paste electrode was formed instead of forming the stretchable conductive adhesive electrode on the prepared highly dielectric elastic body.

Comparative Example 9

An elastic structure was prepared in the same manner as in Example 1, except that an electrode was formed using a copper tape instead of forming the stretchable conductive adhesive electrode on the prepared highly dielectric elastic body.

Comparative Example 10

An elastic structure was prepared in the same manner as in Example 1, except that 0.707 mmol, instead of 0.598 mmol, of ODTMS was used and an electrode was formed using a copper tape instead of forming the stretchable conductive adhesive electrode on the prepared highly dielectric elastic body.

Comparative Example 11

An elastic structure was prepared in the same manner as in Example 1, except that 0.825 mmol, instead of 0.598 mmol, of ODTMS was used and an electrode was formed using a copper tape instead of forming the stretchable conductive adhesive electrode on the prepared highly dielectric elastic body.

Comparative Example 12

An elastic structure was prepared in the same manner as in Example 1, except that 0.943 mmol, instead of 0.598 mmol, of ODTMS was used and an electrode was formed using a copper tape instead of forming the stretchable conductive adhesive electrode on the prepared highly dielectric elastic body.

Comparative Example 13

An elastic structure was prepared in the same manner as in Example 1, except that an electrode was formed using a conductive silver epoxy adhesive instead of forming the stretchable conductive adhesive electrode on the prepared highly dielectric elastic body.

Comparative Example 14

An elastic structure was prepared in the same manner as in Example 1, except that 0.707 mmol, instead of 0.598 mmol, of ODTMS was used and an electrode was formed using a conductive silver epoxy adhesive instead of forming the stretchable conductive adhesive electrode on the prepared highly dielectric elastic body.

Comparative Example 15

An elastic structure was prepared in the same manner as in Example 1, except that 0.825 mmol, instead of 0.598 mmol, of ODTMS was used and an electrode was formed using a conductive silver epoxy adhesive instead of forming the stretchable conductive adhesive electrode on the prepared highly dielectric elastic body.

Comparative Example 16

An elastic structure was prepared in the same manner as in Example 1, except that 0.943 mmol, instead of 0.598 mmol, of ODTMS was used and an electrode was formed using a conductive silver epoxy adhesive instead of forming the stretchable conductive adhesive electrode on the prepared highly dielectric elastic body.

TEST EXAMPLES

Test Example 1: Dielectric Constant of Highly Dielectric Elastic Structure Depending on ODTMS Content For the highly dielectric elastic structures prepared in Examples 1-4 and Comparative Examples 1-16, dielectric constant was measured using an impedance analyzer (Agilent 4263B), and the results are shown in Table 1 below.

TABLE 1

|  | Electrode | Highly dielectric elastic body | | | | |
| --- | --- | --- | --- | --- | --- | --- |
|  |  | PDMS base content (mg) | PDMS curing agent content (mg) | Carbon black content (mg) | ODTMS content (mmol) | Dielectric constant (at 100 Hz) |
| Untreated group | — | 1000 | 100 | Untreated | 0 | 2.72 |
| Example 1 | Silicone-based silver/CNT | 1000 | 100 | 22.4 | 0.598 | 22.15 |
| Example 2 | Silicone-based silver/CNT | 1000 | 100 | 22.4 | 0.707 | 118.54 |
| Example 3 | Silicone-based silver/CNT | 1000 | 100 | 22.4 | 0.825 | 218.41 |
| Example 4 | Silicone-based silver/CNT | 1000 | 100 | 22.4 | 0.943 | 330.11 |
| Comp. Ex. 1 | Sputtering Pt | 1000 | 100 | 22.4 | 0.598 | 21.22 |
| Comp. Ex. 2 | Sputtering Pt | 1000 | 100 | 22.4 | 0.707 | 120.15 |
| Comp. Ex. 3 | Sputtering Pt | 1000 | 100 | 22.4 | 0.825 | 210.11 |
| Comp. Ex. 4 | Sputtering Pt | 1000 | 100 | 22.4 | 0.943 | 317.21 |
| Comp. Ex. 5 | Acrylic silver paste | 1000 | 100 | 22.4 | 0.598 | 8.21 |
| Comp. Ex. 6 | Acrylic silver paste | 1000 | 100 | 22.4 | 0.707 | 22.45 |
| Comp. Ex. 7 | Acrylic silver paste | 1000 | 100 | 22.4 | 0.825 | 30.45 |
| Comp. Ex. 8 | Acrylic silver paste | 1000 | 100 | 22.4 | 0.943 | 45.87 |
| Comp. Ex. 9 | Copper tape | 1000 | 100 | 22.4 | 0.598 | 9.57 |
| Comp. Ex. 10 | Copper tape | 1000 | 100 | 22.4 | 0.707 | 28.45 |
| Comp. Ex. 11 | Copper tape | 1000 | 100 | 22.4 | 0.825 | 31.54 |
| Comp. Ex. 12 | Copper tape | 1000 | 100 | 22.4 | 0.943 | 60.11 |
| Comp. Ex. 13 | Silver epoxy | 1000 | 100 | 22.4 | 0.598 | 8.98 |
| Comp. Ex. 14 | Silver epoxy | 1000 | 100 | 22.4 | 0.707 | 15.45 |
| Comp. Ex. 15 | Silver epoxy | 1000 | 100 | 22.4 | 0.825 | 24.58 |
| Comp. Ex. 16 | Silver epoxy | 1000 | 100 | 22.4 | 0.943 | 38.45 |

The dielectric constant was significantly higher for the highly dielectric elastic structures of Examples 1-4 of the present disclosure and Comparative Examples 1-4 as compared to the elastic structures of Comparative Examples 5-16. For Examples 1-4 of the present disclosure, the dielectric constant was higher as the content of ODTMS was higher.

Figure 2:
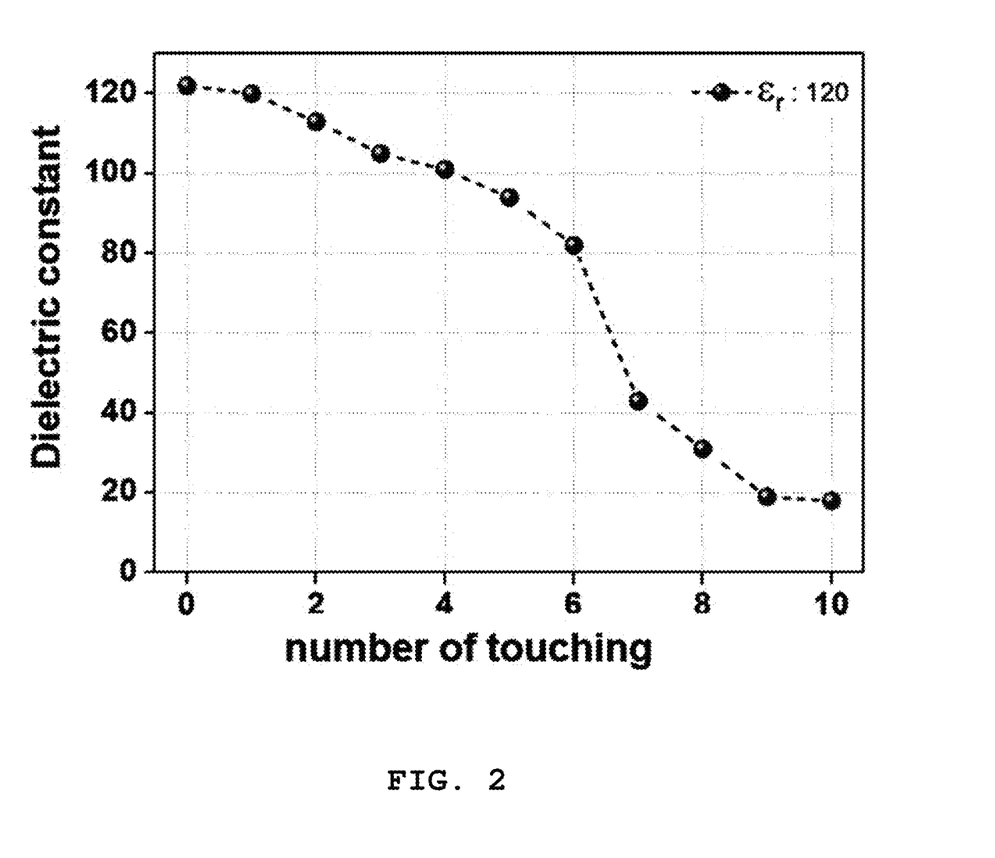
FIG. 2 shows the change in dielectric properties of a highly dielectric elastic structure made of a Pt electrode of Test Example 2.

Test Example 2: Change in Dielectric Properties of Highly Dielectric Elastic Structure Made of Pt Electrode After applying a force of 100 kPa to the highly dielectric elastic structure of Comparative Example 2 multiple times, dielectric constant was measured using an impedance analyzer (Agilent 4263B). The result is shown in FIG. 2. It can be seen that the dielectric constant of the platinum-coated highly dielectric elastic structure decreases as force is applied thereto.

Figure 3:
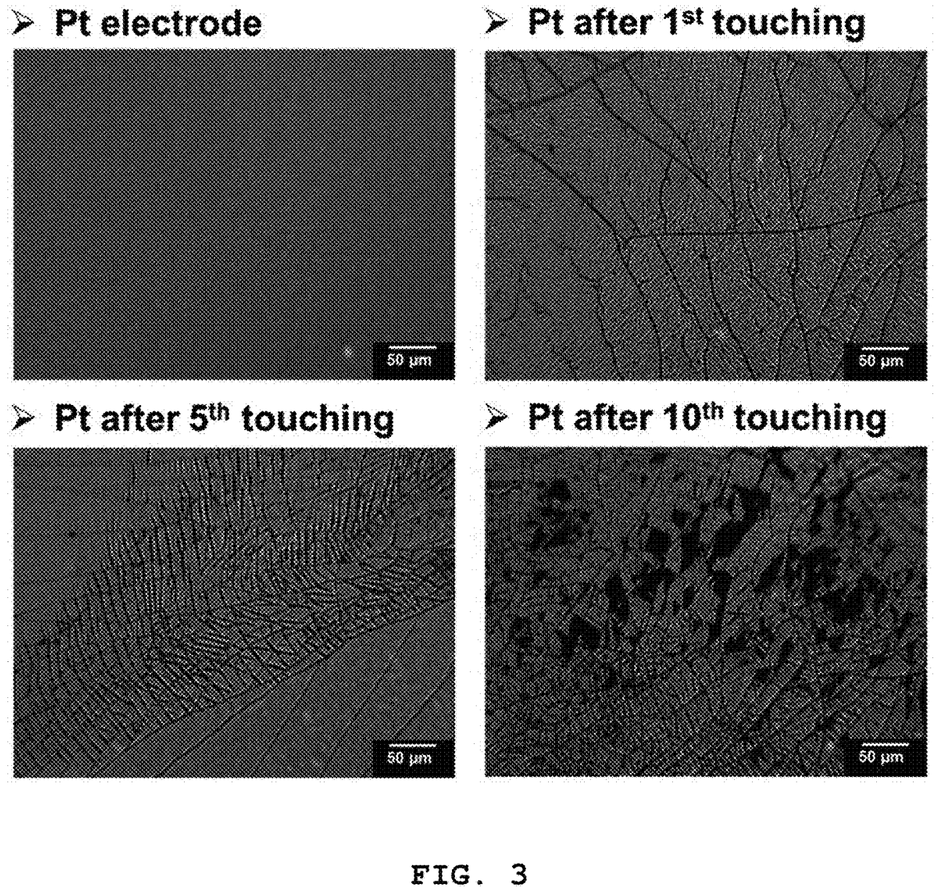
FIGS. 3 and 4 illustrate the electrode reliability evaluation results of a stretchable conductive adhesive layer and a platinum coating layer of a highly dielectric elastic structure of Test Example 3.
Figure 4:
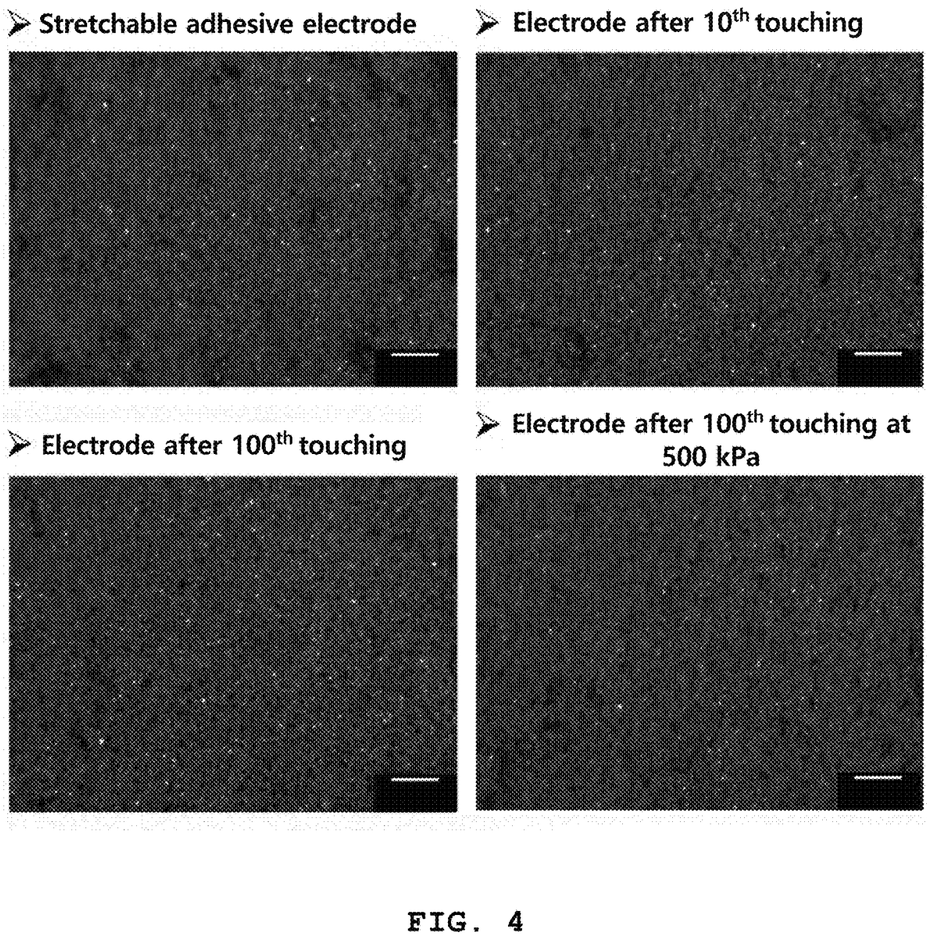

Test Example 3: Evaluation of Electrode Reliability of Stretchable Conductive Adhesive Layer and Platinum Coating Layer of Highly Dielectric Elastic Structure After applying a force of 100 kPa or 500 kPa to the electrode layer of the highly dielectric elastic structure of Example 2 and the highly dielectric elastic structure of Comparative Example 2 multiple times, the state of the platinum electrode was observed using an optical microscope (DM2500M). The state of the platinum electrode of Comparative Example 2 is shown in FIG. 3, and the state of the electrode of Example 2 is shown in FIG. 4. It can be seen that the stretchable conductive adhesive of the highly dielectric elastic structure of Example 2 exhibits higher reliability as compared to the sputtered platinum electrode of the highly dielectric elastic structure of Comparative Example 2.

Those skilled in the art will appreciate that the conceptions and specific embodiments disclosed in the foregoing description may be readily utilized as a basis for modifying or designing other embodiments for carrying out the same purposes of the present disclosure. Those skilled in the art will also appreciate that such equivalent embodiments do not depart from the spirit and scope of the disclosure as set forth in the appended claims.

What is claimed is:

1. A highly-dielectric, elastic structure, comprising:
an elastic body that is highly-dielectric and comprises:
a polymer matrix that comprises 1000 parts by weight of a polydimethylsiloxane (PDMS) base and 100 parts by weight mg of a PDMS curing agent, and has a tensile strength of 0.1 to 10 MPa; and 22.4 parts by weight of carbon black that is a dielectric material and a conductive filler, that is surface-treated with octadecyltrimethoxysilane (ODTMS) in an amount of at least 0.707 mmol per 22.4 parts by weight of the carbon black, and that is dispersed in the polymer matrix and cured; and an adhesive electrode that is adhesive and stretchable, that is disposed on the body, and that comprises:
a polymer adhesive comprising a 500 parts by weight of a thermosetting silicone-based polymer adhesive including a curable polymer and a curing agent; and
a conductive filler comprising 1500 parts by weight of silver particles and 4000 parts by weight of a carbonaceous material that is a multi-walled carbon nanotube that are dispersed in the polymer adhesive and cured.

2. The highly-dielectric, elastic structure according to claim 1, wherein the polymer matrix of the elastic body has a dielectric constant of 1-10.

3. The highly-dielectric, elastic structure according to claim 1, wherein the polymer adhesive of the adhesive electrode comprises 5-20 parts by weight of the curing agent based on 100 parts by weight of the curable polymer.

4. The highly-dielectric, elastic structure according to claim 1, wherein the polymer adhesive of the adhesive electrode has a bulk tensile strength of 0.1-10 MPa after curing.

5. The highly-dielectric, elastic structure according to claim 1, wherein the polymer adhesive of the adhesive electrode has a volume shrinkage ratio of 1-10% after curing.

6. The highly-dielectric, elastic structure according to claim 1, wherein the polymer adhesive comprises 10-120 parts by weight of the curing agent based on 100 parts by weight of the curable polymer.

7. The highly-dielectric, elastic structure according to claim 1, wherein the metal of the conductive filler is a mixture of metal particles having a diameter of 100-200 nm, 1-4 µm, or 5-10 µm.

8. The highly-dielectric, elastic structure according to claim 1, wherein the carbonaceous material of the conductive filler is a multi-walled carbon nanotube having a diameter of 15-40 nm and a length of 10-50 µm.

9. The highly-dielectric, elastic structure according to claim 1, wherein the elastic body and the adhesive electrode are connected to each other to form a single structure.

10. A touch sensor comprising the highly-dielectric, elastic structure according to claim 1.

11. The touch sensor according to claim 10, wherein the touch sensor is a capacitance-type force sensor.

* * * * *